Patented Feb. 5, 1929.

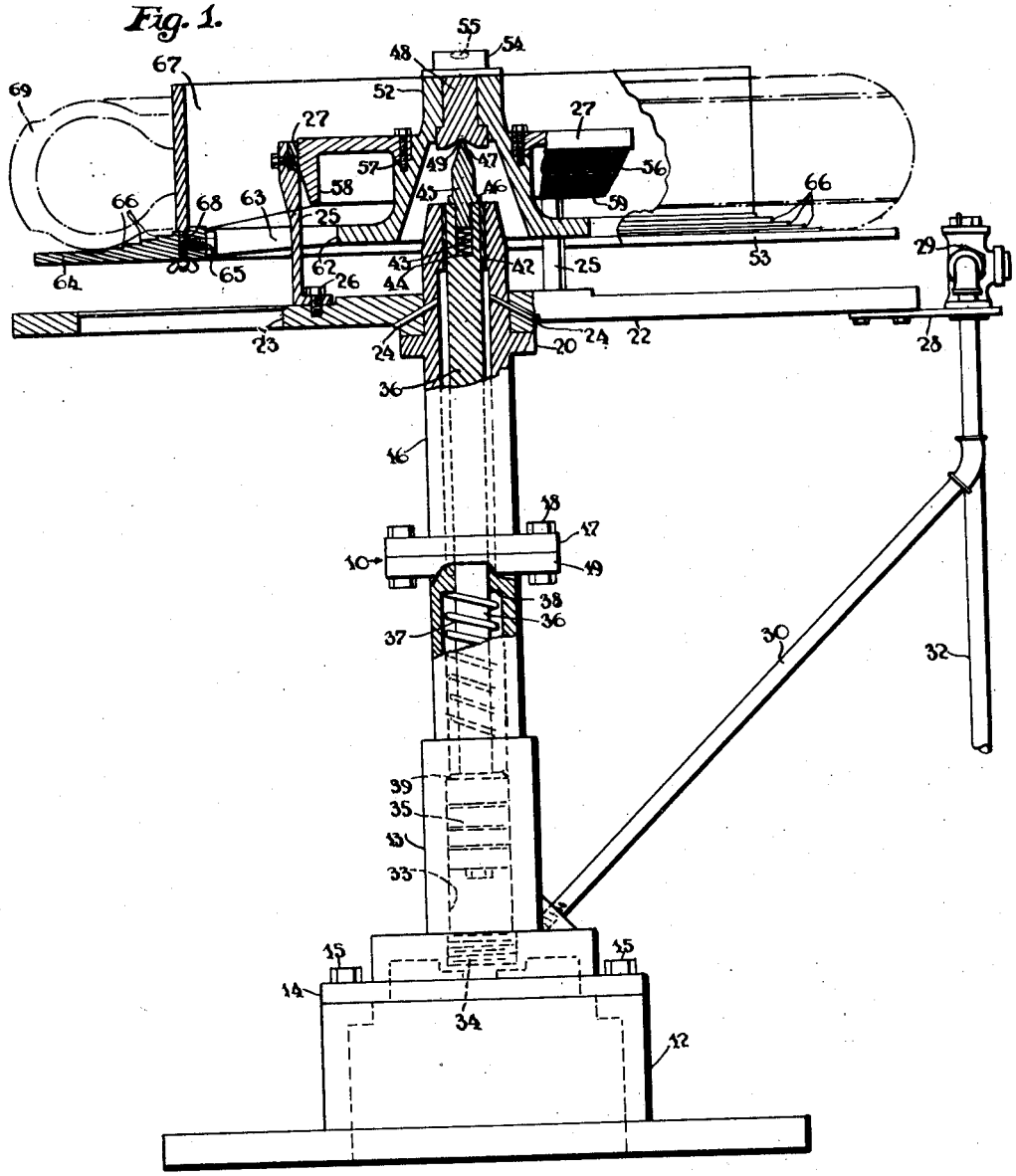

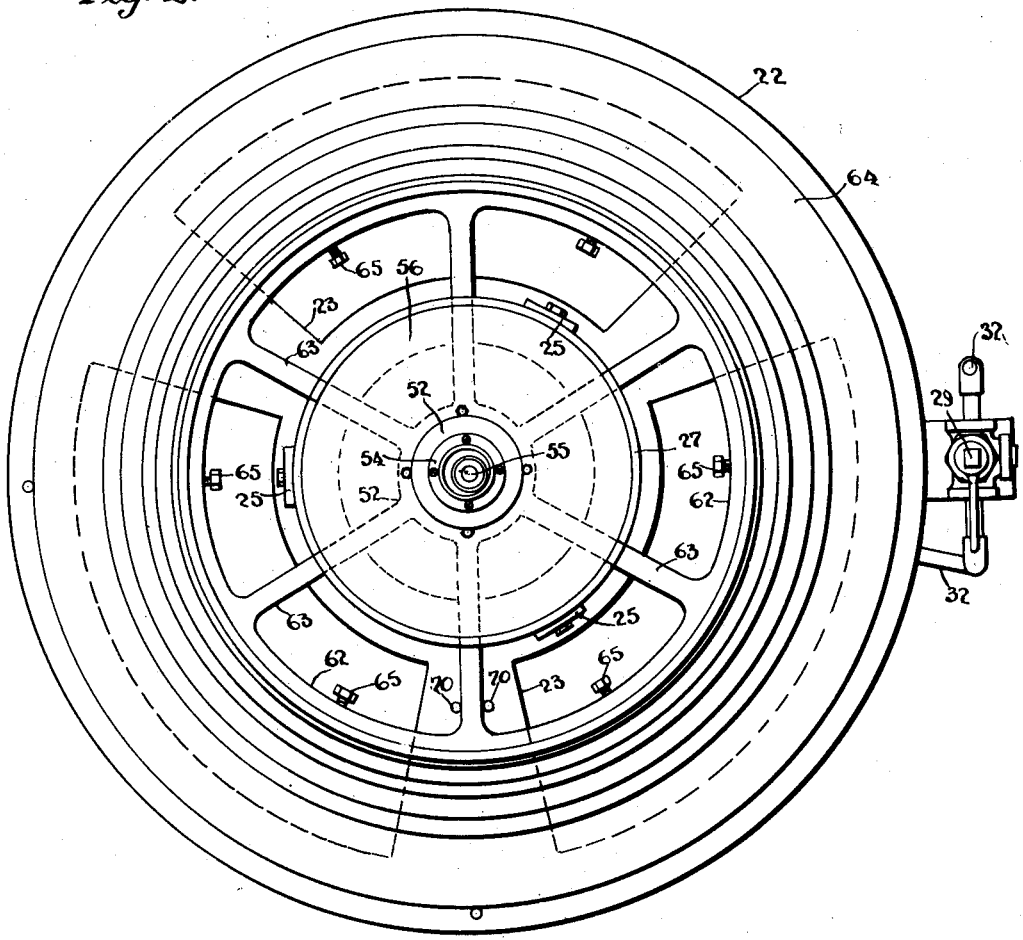

1,701,464

UNITED STATES PATENT OFFICE.

HERMAN T. KRAFT, OF AKRON, OHIO, ASSIGNOR TO THE GOODYEAR TIRE & RUBBER COMPANY, OF AKRON, OHIO, A CORPORATION OF OHIO.

TIRE-TESTING MACHINE.

Application filed February 23, 1928. Serial No. 256,156.

My invention relates to machines for testing vehicle tires and it has particular relation to apparatus for determining whether the various portions of pneumatic tires are properly balanced.

One object of my invention is to provide a simple and convenient machine upon which a vehicle tire may be placed and including a mechanism which immediately determines whether or not the tire is properly balanced.

In the manufacture of pneumatic tires it has been found to be practically impossible to build a tire of exactly uniform weight throughout. It has further been found that a tire which is not properly balanced; that is, a tire having certain circumferential portions heavier than others, if placed on the wheel of an automobile, is likely to cause vibration of the vehicle, which tends to reduce the life of the latter, as well as of the tire, and is annoying to the passengers riding therein.

Manufacturers of automobiles before buying tires insist that the location of the unbalanced portions thereof be determined in order that the heavier portions of the tires may be marked before the tires are shipped. The amount of material or weight in the unbalanced portion of a tire is relatively small and by placing the valves of the inner tubes in the tires opposite to the marked portions, the weight thus added compensates for the unbalanced portion of the tire.

Heretofore the testing operation was performed by mounting a tire upon a freely rotatable and balanced rim or wheel that was then permitted to rotate until it came to rest with the heavier portion of the tire lowermost. However, this method of testing is not very accurate and requires considerable time as the mandrel and tire are likely to vibrate backward and forward for a considerable interval before coming to rest. My machine has been designed to overcome these difficulties.

For a better understanding of my invention reference may now be had to the accompanying drawings, forming a part of this specification, of which;
Figure 1 is a view, partially in elevation and partially in cross-section, showing an apparatus embodying my invention; and Figure 2 is a plan view of the apparatus shown by Figure 1.
In practicing my invention I provide a pedestal 10 comprising a base portion 12 and a tubular column section 13 having flanges 14 resting on the base portion and secured thereto by bolts 15. A second hollow column section 16 having a flange 17 is secured, as indicated at 18, to a complementary flange 19 of the column section 13. A flange 20, located intermediately of the column section 16, supports a platform 22, having weight-reducing openings 23 therein, and that is secured to the column section by means of pins 24. The upper surface of the platform is provided with vertically disposed brackets 25 secured thereto, as indicated at 26, and an annular member 27 is rigidly supported by the upper ends of the brackets.

Adjacent one edge of the platform 22 a bracket 28 bolted thereto supports an air valve 29 that regulates the flow of fluid under pressure through a pipe 30. A pipe 32 supplies compressed fluid to the valve from a suitable source of supply (not shown) and the pipe 30 leads to a cylindrical chamber 33 formed in the tubular section 13. The cylindrical chamber is closed at its lower end by a plug or cylinder head 34. A piston 35 having a piston rod 36 rigidly connected thereto is slidably mounted within the cylindrical chamber and a coil spring 37 rests at its lower end upon the upper face of the piston and at its upper end engages a shoulder 38 within the hollow column section 13. The spring tends to force the piston downwardly to its lower or normal position against the cylinder head 34. It also tends to cushion the piston as the latter reaches the limit of its upward stroke which is defined by the shoulder 39.

The upper end of the piston rod 36 extends through a bushing 42 in the top of the column section 16 and has a compression spring 43 secured within a bore 44 in its upper end. This compression spring engages the lower end of a bearing plug 45 having a shoulder 46 thereon, and the upper end of which constitutes a conical bearing member 47.

A bearing member 48 having a conically concave lower surface 49 rests upon the point of the bearing member 45. This bearing member is adapted to fit within a hub 52 that forms an integral portion of a balancing disc 53. A small circular spirit level 54 having a bubble 55 therein is mounted upon the top of the hub 52 and serves to indicate whether or not the disc 53 is disposed in a horizontal plane. Adjacent the mid portion of the hub 52, an annular cup-shaped member or drum 56 is bolted to a shoulder 57 of the hub, and is provided with a downwardly, inwardly converging flange 58, whose outer surface is slightly spherical and which is lined with circumferentially disposed graduations 59. It will be observed that the ring 27 surrounds the drum 56 relatively loosely, but it serves to prevent undue oscillation of the disc 53 when it is pivoted freely upon the point of the bearing member 45. By noting the angular relation of the edge of the ring with respect to the lines 59 on the flange 58, the degree to which the disc is deflected at any time can be determined.

A plurality of openings 62 formed in the disc 53 define spokes 63 extending radially from the hub 52 and are integral with an outer annular portion 64 of the disc in whose inner periphery a number of balancing screws 65 are arranged. These screws may be adjusted inwardly or outwardly radially for properly balancing the disc 53. The upper surface of the annular portion 64 is formed with a number of annular shoulders or steps 66 which serve as seats for various sizes of rings, one of which is indicated at 67. The rings are positively but removably secured to the annular disc portion 64 by means of bolts or studs 68 extending therethrough. The outer circumference of the ring 67 is approximately equal to the inner circumference of a pneumatic tire 69 that is adapted to fit snugly thereabout.

A pair of vertically disposed pins 70 secured in the platform 22 straddle one of the spokes 62 and prevent relative rotation between the platform 22 and the disc 53.

In the operation of the machine above described, a ring 67 of the proper size is first selected and placed upon one of the steps 66. Normally the disc 53 rests upon the platform 22 and the conical bearing 47 does not engage the surface 43. The tire 69 is then placed over this ring in order to center it correctly upon the balancing disc 53. By admitting compressed air to the cylindrical chamber 33 by opening the valve 29, the piston 35 is raised against the force of the spring 37 and, in turn, the piston rod 36 actuates the bearing plug 45 to raise the balancing disc away from the platform 22. If one side of the tire is heavier than the other, the disc 53 will be deflected upon its bearing point 47, and the location of the heavier portion will be indicated by the position of the bubble 55 in the spirit level 54. The heavy portion of the tire is then marked, and the compressed air is released from the chamber 33. At the same time, the spring 21 forces the piston back to the lower portion of the chamber and another tire may then be placed upon the ring 67 to be tested in the manner just descried.

Also by noting the relation between the graduations 59 and the edges of the ring 27, an operator may determine the degree to which the tire is unbalanced, or whether or not the disc 53 is in proper operative position with respect to the platform 22.

From the foregoing description it will be apparent that I have provided a simple and convenient means whereby the automobile tires may rapidly be tested to determine the location of the unbalanced portions thereof.

Although I have illustrated but one form which my invention may assume and have described in detail but a single application thereof, it will be apparent to those skilled in the art that it is not so limited but that various minor modifications and changes may be made therein without departing from the spirit of the invention or from the scope of the appended claims.

What I claim is:

1. A testing device for automobile tires comprising a support, a resiliently mounted pivotal point thereon, a freely tiltable table balanced on the point, and means for indicating deflections of the table.

2. A testing device for annular articles, comprising a support, a spring mounted pivotal bearing on the support, means for raising or lowering the pivotal bearing, a table supported on said bearing, and means for indicating deflections of the table.

3. A device for testing automobile tires comprising a support, a spring cushioned pivotal bearing mounted on the support, means for raising or lowering the pivotal bearing, a tire supporting tiltable disc balanced on the pivotal bearing, means for indicating deflections of the disc associated therewith, and means on the disc for centering tires supported thereon.

4. A device for testing automobile tires comprising a support, a pivotal bearing mounted on the support, means for raising or lowering the pivotal bearing, a tire supporting tiltable disc balanced on the pivotal bearing, means for centering tires supported thereon, said means comprising a ring over which tires may be slipped and means on the disc for seating the ring.

5. A device for testing automobile tires comprising a support, a pivotal bearing mounted on the support, means for raising or lowering the pivotal bearing, a tire supporting tiltable disc balanced on the pivotal bearing, means for indicating deflections of the disc associated therewith, and seating means comprising a series of concentric shoulders adapted to serve as seats for rings of various sizes to fit the inner peripheries of the tires to be tested on the disc.

6. A device for testing automobile tires, comprising a support having a pivotal point thereon, a tiltable testing table balanced on the point, a series of concentric shoulders on the table, said shoulders being adapted to form seats for rings of diameters suitable to fit within the inner peripheries of tires to be tested.

7. A device for testing automobile tires comprising a support having a pivotal point thereon, a tiltable testing table balanced on the pivotal point, means for balancing the table comprising radially adjustable screw devices secured thereto, means on the table for centering tires, and means for indicating deflections thereof from a horizontal plane.

8. A device for testing automobile tires comprising a support having a pivotal point thereon, a tiltable testing table balanced on the pivotal point, and means for arresting vibration of the table, including an annular flange secured to the table, an annular ring secured to the support adjacent the flange, and means for bringing the flange and ring into contact with each other.

9. A device for determining the balance of automobile tires comprising a support having a pivotal point thereon, means for raising and lowering the pivotal point, a tiltable tire supporting table balanced on the point, means for indicating deflections of the table, a substantially vertical flange secured to the table and a ring secured to the support adjacent the flange and adapted to contact therewith when the pivotal point is raised.

10. A device for testing automobile tires comprising a rigid platform, a spring supported pivotal member mounted for vertical movement above the table, a tire supporting table balanced on the pivotal member in operative position and adapted to rest on the rigid table in operative position, and means for determining deflections of the tire supporting table member.

11. A device for testing automobile tires comprising a base, a vertically movable piston mounted within the base, a pivot point upon the upper end of the piston, a freely tiltable table balanced upon the pivot point, an annular flange upon the table, peripherally extending graduations upon the flange, and indicating means extending adjacent a plurality of points upon the flange.

In witness whereof, I have hereunto signed my name.

Signed at Akron, in the county of Summit and State of Ohio, U. S. A., this 21st day of February, 1928.

HERMAN T. KRAFT.